United States Patent [19]

Levine

[11] Patent Number: 5,289,531
[45] Date of Patent: Feb. 22, 1994

[54] REMOTE SCHEDULING OF APPOINTMENTS WITH INTERACTIVETY USING A CALLER'S UNIT

[76] Inventor: Alfred B. Levine, P.O. Box 34-1738, Bethesda, Md. 20827

[21] Appl. No.: 763,420

[22] Filed: Sep. 20, 1991

Related U.S. Application Data

[62] Division of Ser. No. 397,914, Aug. 24, 1989, Pat. No. 5,113,380.

[51] Int. Cl.⁵ .................................. H04M 11/00
[52] U.S. Cl. .................................. 379/93; 379/104; 368/10
[58] Field of Search ............... 379/52, 96–99, 379/93, 441–444, 354–356, 90, 110, 104, 88; 368/10, 4, 13, 41–43, 28–30, 72–74, 250–251; 364/406, 410, 705, 569; 340/309.15, 309.4

[56] References Cited

U.S. PATENT DOCUMENTS

| | | | |
|---|---|---|---|
| 4,542,480 | 9/1985 | Orii | 364/410 |
| 4,626,836 | 12/1986 | Curtis et al. | 368/41 |
| 4,799,254 | 1/1989 | Dayton et al. | 379/97 |
| 4,908,853 | 3/1990 | Matsumoto | 379/356 |
| 5,113,380 | 5/1992 | Levine | 379/96 |

FOREIGN PATENT DOCUMENTS

57-111656 7/1982 Japan .
57-111657 7/1982 Japan .
57-111658 7/1982 Japan .

Primary Examiner—Wing F. Chan

[57] ABSTRACT

An electronic rescheduler for promptly and efficiently rescheduling appointments in a two part procedure. In the first step, there is an initial selection of one or more different time periods or "options" during which a new, replacement appointment would be desired; and, in response, the electronic rescheduler reports a listing of free time slots that are available within the selected "options". In the second, and final step, on of the reported free time slots is chosen for the new appointment, and is entered into the rescheduler to complete the rescheduling operation. A number of such "options" are made available, including "morning" or "afternoon" appointments, the "earliest" available time, and others. For office use, the electronic rescheduler can be configured as a desk top unit positioned alongside a telephone, and coupled to the phone. It may include a display screen, printer, and audible announcer, for voice response over the phone; as well as a keyboard for the various entries and selections. Appointments can be rescheduled promptly in either a semi-automatic or fully automatic manner, by direct interaction with the rescheduler by a person, or by remotely controlled operation over the telephone. A more simplified interactive telephone operation is also provided, to permit a caller to operate the electronic rescheduler over the telephone in an automatic manner.

16 Claims, 4 Drawing Sheets

| 41 MORNING | 42 AFTERNOON | 43 SAME WEEK DAY | 44 SAME TOD | 45 SELECTED DAY |
|---|---|---|---|---|
| 8:30 AM 8/26 | 2:00 PM 8/26 | 2:00 PM 9/1 | 9:00 AM 8/28 | 9:00 AM 8/29 |
| 10:00 AM 8/26 | 3:15 PM 8/28 | 2:30 PM 9/1 | 9:00 AM 8/29 | 2:15 PM 8/29 |
| 11:45 AM 8/27 | 4:30 PM 8/29 | 5:00 PM 9/8 | 9:00 AM 8/31 | 4:30 PM 8/29 |

23 (DISPLAY)

REMOTE SCHEDULING OF APPOINTMENTS WITH INTERACTIVETY USING A CALLER'S UNIT

This is a division of patent application, Ser. No. 397,914, filed Aug. 24, 1989, now U.S. Pat. No. 5,113,380.

STATEMENT OF THE INVENTION

This invention generally relates to improvements in electronic scheduling of appointments; and more particularly, to cancelling or rescheduling prior appointments to new dates and times.

BACKGROUND AND PRIOR PATENTS

In a family of earlier patents, and pending applications, including U.S. Pat. No. 4,162,610 and U.S. Pat. No. Re. 32,655; U.S. Pat. No. 4,548,510; U.S. Pat. No. 4,769,796; U.S. Pat. No. 4,783,800, and others, there are disclosed a number of different electronic schedulers and systems for more efficiently managing the use of time by both individuals and businesses. In such schedulers, a number of appointments are entered and stored in a memory for a number of different time periods in the future, and are retained in retrievable form as a rapidly accessable record of a user or users future committments. At the convenience of the user, the schedules of appointments for any selected time period, or periods, are selectively retrieved from the memory and communicated by any one of a visual display, a printed record, or an audible announcement. Alternatively, or additionally, a subschedule of free or available time slots are selectively determined from the memory, for any selected future time period, to assist the user in making, and confirming, a new appointment in the future.

Additionally, in such earlier patents and applications, any of the appointments stored in the memory can be randomly cancelled or rescheduled, by erasing the memory for that time slot and reentering a new appointment for a different time.

However, the occurance of an unexpected event, such as an emergency event, or other of greater priority, often makes it necessary for an office to cancel an entire series of appointments on a given day, or time period, and to reschedule each of such cancelled appointments to other times that are more convenient, and available to both parties.

Conversely, it is often necessary that an individual scheduled for an appointment with an office, is required to cancel that appointment, or reschedule it to a different time. The rescheduling of such appointments, whether by a office, or an individual, is often difficult and time consuming, particularly where the office is very busy, receiving many calls daily, and dealing with many persons during a typical working day. Furthermore, where the need arises to cancel or reschedule an appointment arises at a time after normal business hours, the prior appointment is often missed, or the rescheduling is delayed until that office reopens for busines on the following business day, often inconveniencing the individual or the office. Rescheduling an entire series of appointments for a day, or other time period, is often a particularly difficult an time consuming chore for many busy offices, such as those of Chiropractors, Dentists, Attorneys, and other professional and business persons, whose active practices include many appointments with different persons during a typical working day. Present practice followed requires that an office employee, such as a nurse, or receptionist, or appointment clerk, telephone each such patient, client, or customer, and individually reschedule each such person, client, or customer, and individually reschedule each such person for a new appointment at a different time that is convenient to that person and also available to that office. Quite often the multiple appointment rescheduling is very time consuming, often resulting in "doubling up"of appointments, or prolonging the office visit to a date in the future other than that desired by the patient, client, or other person.

SUMMARY OF THE INVENTION

According to the present invention, an electronic rescheduler is provided to enable an office to more easily and promptly reschedule an appointment, or an entire group of appointments; or to enable an individual to more easily and conveniently reschedule an appointment, or cancel it, with an office, regardless of whether that office is open for business or not when the need for such cancellation or rescheduling arises.

In one preferred embodiment for group rescheduling, the office individually calls each person, whose appointment is to be cancelled or rescheduled, and with the assistance of the present invention, rapidly and efficiently locates a new appointment time, if available, that is convenient to both that person and the office. This is performed by offering to each such person a series of "options" or time periods, that are convenient for a new appointment, and then having such person choose from the free or available time slots, within the chosen time period, that one appointment time that best meets the needs of that person. One of the many "options" that is offered is the available or free time slots that are closest in time to the prior appointment time being rescheduled. Other "options" include the earliest available group of "morning" free time slots. Still another "option", is the earliest available group of free time slots occuring in the "afternoon". Still a fourth "option" is the earliest available group of free time slots for a specified time-of-day. Still further options can be provided, such as those for a specified day; or specified day of the week; or for a specified day of the month.

Having made an initial selection of a desired "option" or time period, the person to be rescheduled is quickly given the one or more free time slots, that are available within the chosen "option"; and can thereafter designate the best one of the free time slots for the new appointment. If a suitable free time slot is not found, that person is permitted to select a different "option", or time period, and the above procedure is repeated to find a new satisfactory appointment time. By use of the present invention, the above steps can be very quickly performed, to complete the rescheduling in a short time.

Where an individual initiates a request to cancel or reschedule an appointment, the present invention operates in the same manner. The office presents the individual with a series of "options" or time periods, in order to narrow the time periods involved; and thereafter notifies the individual with one, or more free or available time slots, if any, within the selected "option" period, for a final selection of the preferred reappointment time.

In an alternative embodiment of the invention, the individual is not required to make a selection from a series of free or available time slots, but the electronic rescheduler automatically makes the final selection from the one or more free time slots, if any, that are available. This embodiment is useful where the individual does not have any specific preference for a free time slot, but can accept any free time within a specified "option" or time period. The individual therefore, merely selects an "option", or time period, and the electronic rescheduler locates and communicates one free time slot within that selected period, in the event that one is available.

In a still further embodiment of the invention, the canceling of appointments or rescheduling to a new appointment time can be performed over the telephone in an semi-automatic manner without the need for any person at the receiving end of the line, such as an office secretary or clerk. This is performed by employing an interactive, communicating system, for audibly instructing each caller whose appointment is to be cancelled or rescheduled, in the procedure to be followed, and permitting each such caller to respond using the convention keys on the telephone keypad. Each such caller is instructed to select, and enter, a preferred one of the "options" or time periods, as discussed above, and in response, to receive an audible announcement over the telephone of the free time slots that are available. The caller is then instructed to choose a desired one of said free time slots, and to enter such final selection using the conventional telephone keys on the keypad.

DETAILED DESCRIPTION OF PREFERRED EMBODIMENTS

GROUP RESCHEDULING BY OFFICE

Figure 1:
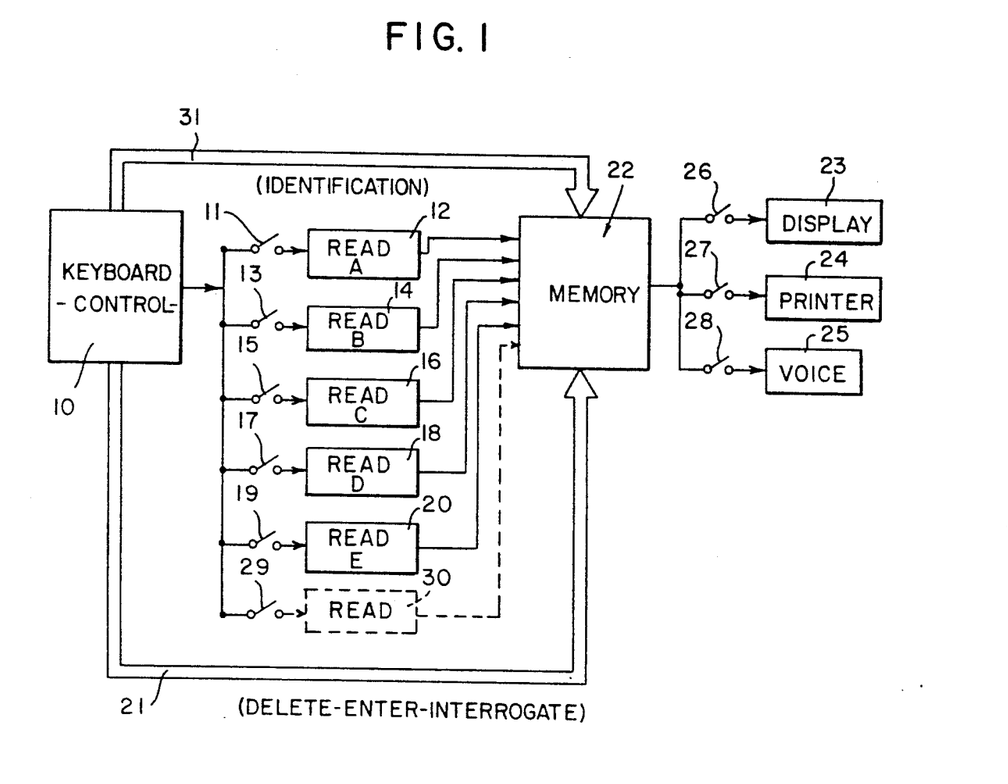
FIG. 1 is an electrical schematic drawing depicting a rescheduling apparatus according to the invention.

Referring to FIG. 1 there is shown one preferred apparatus for cancelling or rescheduling one, or more appointments, that have been previously stored in a memory 22, by day, time-of-day, and person etc. As noted above, it is often found necessary to reschedule an entire series of appointments where a key person at that office is called away on an emergency, or for other reason is unable to keep such appointments.

As shown, the rescheduler generally comprises a multiple key keypad, or keyboard; a series of individually selectable read-out circuits 12, 14, 16, 18, 20, and 30; an electronic memory 22 for storing a series of appointments each day for a series of different days, and for a series of different persons; and a series of different output devices, including a visual display panel 23, a printer 24, and an audible announcer 25. In a typical office environment, the apparatus of FIG. 1 may be a dedicated desk-top unit, located on the desk of the Receptionist for that office, or the Nurse, Appointment Scheduling Clerk, or other office employee, and having the large display screen 23, keyboard 10 located near the telephone. The office employee can therefore quickly and efficiently use the apparatus to cancel or reschedule appointments in response to phone calls, or in response to a request from a business visitor at that office.

Each of the different read-out circuits 12, 14, 16 etc. is selectively energizable by its own individual switch circuit 11, 13, 15, 17, 19, and 29, respectively, and when energized, each such read-out circuit is adapted to interrogate the memory 22 according to a different "option", mode, or time period, thereby to locate one or more free time slots that are available for a future appointment within the selected time period or "option". For example, the first read-out circuit 12 interrogates the memory 22 for two days before, and two days after, the day of the appointment to be rescheduled, and to read-out all of the free or available time slots within said four days, if any, for assistance in making a new appointment. The free time slots are displayed on the visual panel 23, and/or printed by printer 24, and/or audibly announced by output device 25.

A second of the read-out circuits 14, differently interrogates the memory 22 according to a different "option", mode, or time period, to read-out all of the free time slots, if any, that are available during the "morning" hours for a series of days immediately preceeding and succeeding the day of the previous appointment. In a similar manner, the third read-out circuit 16 also differently interrogated the memory 22 to obtain the free time slots, if any that are available in the "afternoon" time periods. A number of other individual read-out circuits, including 18, 20, 30, etc. may also be provided, with each differently interrogating the memory 22 according to a different "option" to derive free time slots, if any, that are available during still different periods. Many such different "options" can be used according to the present invention, including a preferred day of the week, or of the month; the same time-of-day but on a different day; or at a specified other time-of-day; etc. Separate read-out circuits can be provided for each of these "options", or others, for interrogating the memory 22.

Quite often, persons whose appointments must be rescheduled by an office prefer a new appointment at the earliest possible time, or one closest in time to the prior appointment. Another group may only be available for a new appointment in the "morning hours", or "afternoon hours", or on a "selected day", or a selected "time-of-day" etc. For this reason, the present invention provides a number of different "options" for selection by the person to be rescheduled, so that that person need consider only the free time slots within the preferred time period or "option". Furthermore by this procedure, a comprehensive memory 22 containing many appointments for many persons, and extending over many days, can be quickly and efficiently interrogated, only for the specific periods of interest.

Figure 2:
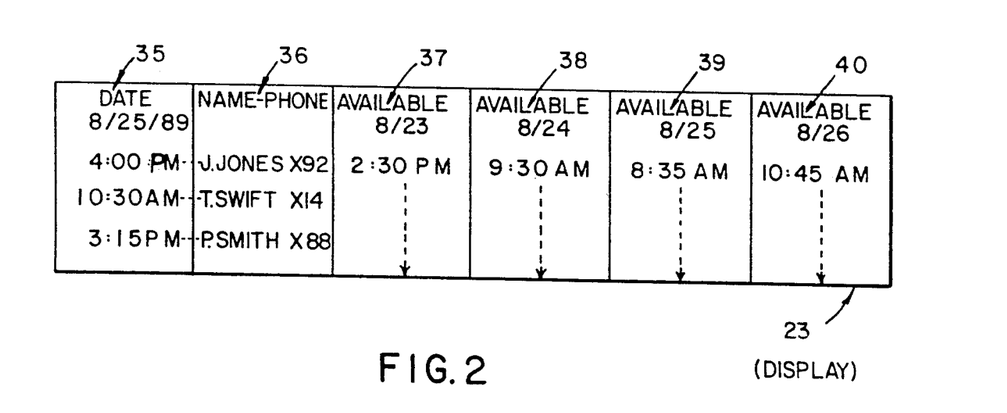
FIG. 2 is a plan view showing the display on the visual display panel for rescheduling a group of appointments.

FIG. 2 illustrates a typical visual presentation on the display panel 23 where the office employee wishes to reschedule all of the appointments on the day of Aug. 25, 1989, and initially selects the first "option". Initially, the employee enters the day of Aug. 25, 1989 followed by depressing a key on the keyboard labeled "Reschedule". Thereafter, the employee closes one of the "option" switches, such as switch 11, thereby the read-out circuit 12 to select the first "option", e.g. locating an new appointment times that are closest in time to the prior appointments to be rescheduled. Referring to FIG. 2, the first, or left hand column 35, on display screen 23 shows the entire day, or other time period to be rescheduled (e.g. Aug. 25, 1989), followed by a series of appointment times for that day (e.g. in the example given, 9:00 AM; 10:30 AM; and 3:15 PM). The second column 36 of the display 23 shows the names and phone numbers of the persons whose appointments are listed in the first column 35, and each is positioned alongside the prior appointment time.

Since many persons usually wish a new appointment time close to the previous appointment, the office employee often selects the first read-out circuit 12, as noted above. The memory 22 is accordingly interrogated by circuit 12 to read-out the free time slots that are available on each of the two days prior, and two days after, the selected day of Aug. 25, 1989. The next column 37 of display 23 shows a listing of all such free time slots, if any, on the second day earlier, or on Aug. 24, 1989. In a similar manner, the next two columns 39 and 40 of display 23 show any free time slots on the two days afterward, or Aug. 26, 1989 and Aug. 27, 1989, respectively.

The Office employee then proceeds to telephone the first person to be rescheduled (e.g. T. Jones, in FIG. 1), and informs T. Jones of the various "options" that are available for a new appointment, together with a request to make a selection or choice of one or more of such "options". In the event that T. Jones wishes the earliest available appointment, as is usually a request, the office employee consults the columns 37, 38, 39, and 40 on the display 23, and offers any one of the displayed free time slots for a new appointment. If any one is found to be acceptable, a new appointment is entered for T. Jones at such time, using the keyboard 10, and the prior appointment on Aug. 25, 1989 is erased.

The office employee then proceeds to telephone the next person to be rescheduled (e.g. T. Swift in FIG. 1), and repeats the above procedure, to quickly and efficiently locate and enter a new, rescheduled appointment for T. Swift. However, in the event that T. Jones or T. Swift desires a different "option" or "options" (e.g. only "morning" appointment, or one only at a specific time-of-day, for example), the office employee opens the switch 11 and closes the corresponding one, or more, of the other "option" selecting switches (FIG. 1), 13, 15, 17, 19, 29 etc., corresponding to the preferences of that person, and the free time slots, if any, corresponding to the selected "options" are displayed as shown in FIG. 3.

Figure 3:
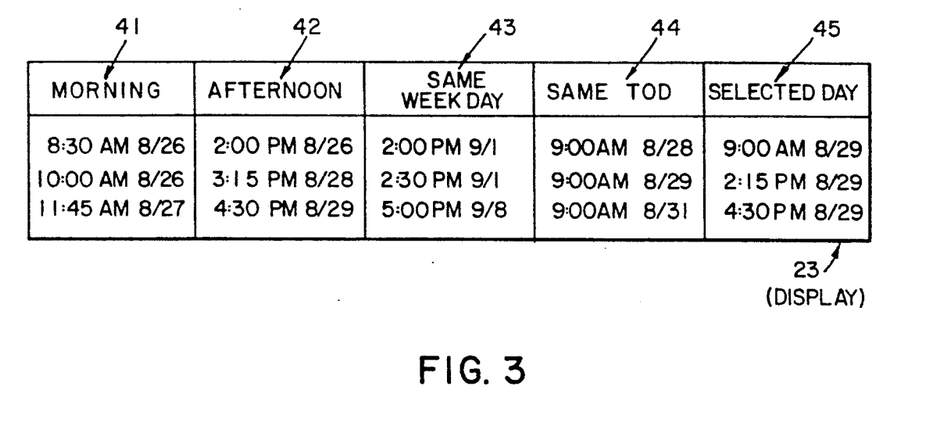
FIG. 3 is a view of the display, similar to FIG. 2, but showing different "options" for selection of a rescheduled appointment.

Referring to FIG. 3, and assuming that five (5) different options are selected by a person, each of switches 13, 15, 17, 19, and 29 are closed by the office employee. The memory 22 is accordingly interrogated in five different modes, or "options", and the resulting free time slots for each "option" are displayed on a different column 41, 42, 43, 44, and 45 of the display 23, as shown in FIG. 3. Referring to FIG. 3, the first column 41 is shown as displaying free time slots that are available during "morning" hours. The second column 43 shows the "afternoon" availabilities, whereas the next columns 43 shows the "afternoon" availabilities, whereas the next columns 43, 44, and 45 show those on the same day of the week; the same time-of-day; and on a selected day of the month, respectively. With this great diversity being available, it is very likely that each person to be rescheduled can quickly find a suitable day and time for a new appointment, and do so quickly, whereby the office can quickly and easily reschedule its complete series of prior appointments on the designated day.

Briefly recapitulating the above described structure and mode-of-operation, to rapidly reschedule a series of appointments for an entire day or other time period, the office employee promptly obtains a display, or printout, of all such appointments to be changed, together with the persons and phone numbers corresponding to such appointments, using the keyboard 10. The office employee also initially may choose the most popular "option" (e.g. of earliest appointment), by closing switch 11 and interrogating the memory 22 by read-out circuit 12. As a result, there is provided on the display 23, a listing of free time slots for a series of days before, and a series of days after, the day to be rescheduled. Each of the persons to be rescheduled are then telephoned, in sequence, by one or more office employees, and are requested to choose an "option" for reappointment, and subsequently choose, a free time slot within said selected "option". Many such different "options" are provided, and more than one can be chosen to meet the alternative, or priority needs of each person. Since many persons wish the earliest available appointment time, close to the prior appointment, a new appointment can often be made using the first display (FIG. 2) corresponding to the first "option". However, if not, the many other options can be chosen, as described in FIG. 3, whereby each person to be rescheduled can usually be accomodated in a timely and efficient manner.

Figure 6:
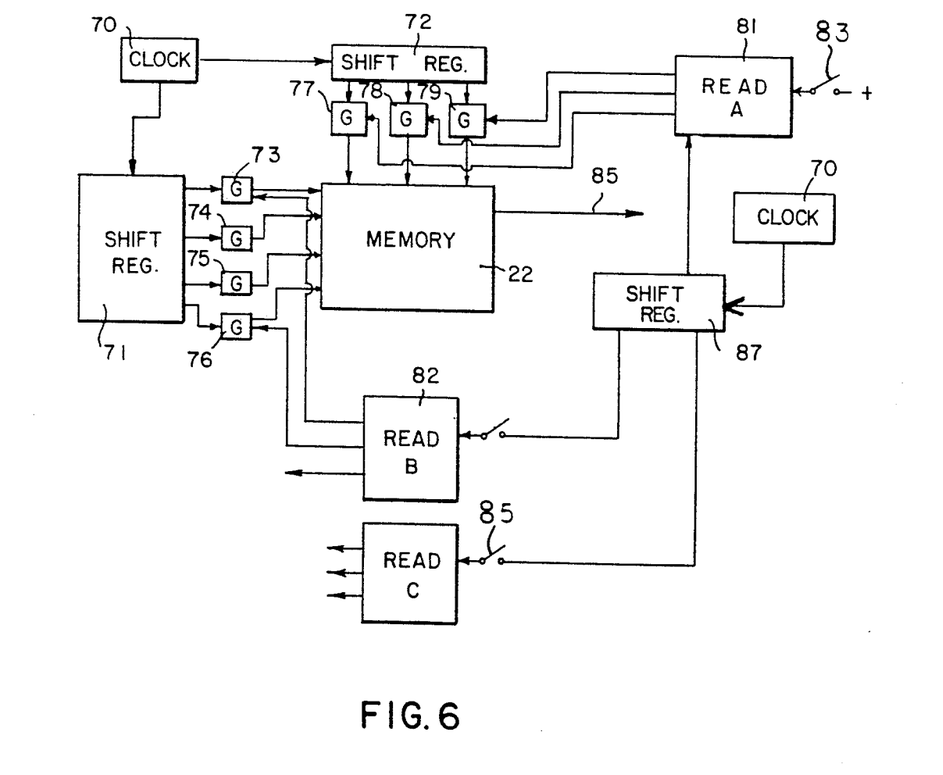
FIG. 6 is an electrical schematic illustration of typical circuit interconnections for the different "option" selections.

FIG. 6 illustrates further details of one circuit for implementing the series of different read-out circuits 12, 14, 16, 18, 20 etc., as shown in FIG. 1. It will be appreciated by those skilled in the art, that the memory circuit 22 shown in the drawings may be only one section, covering a time period of one day, and that many of such circuits, using microchips, will be required for an office system that is used for storing many days of appointments, for a number of different persons in an office (e.g. a clinic of doctors, or a firm of lawyers etc.). The circuit of FIG. 6 will therefore be duplicated, and extended, to meet the needs of different office users. Referring to FIG. 6, a series of shift register circuits 71, 72 . . . , are energized by a clock circuit 70, to sequentially cycle and provide a time delayed sequence of output pulses, on the many output lines of each register circuit 71, 72 . . . Each of such output lines is directed through a different gating circuit 73, 74, 75, 76 . . . for register 71, and similarly, the output lines of register 72 are each directed to a different gating circuit 77, 78, 79, 80 . . . ; all leading to the memory microchips 22. Since each of these output lines are energized in sequence from each of the registers, each of the different gating circuits are likewise energized in sequence. The outputs of the gating circuits are each directed to different "addresses" inputs of the memory microchips 22; and therefore each of the different memory addresses is sequentially interrogated, depending upon those of the gating circuits that are energized to be closed. Conversely, those of the gating circuits that are not energized do not interrogate the corresponding addresses of the memory 22.

The first of the Read out circuits 81 is connected to energize only selected ones of gating circuits leading to selected ones of the addresses of the memory 22. According to the present invention, the first read-out circuit 81 (or 12 in FIG. 1), is connected to interrogate only the two days before and two days after the day to be rescheduled. Therefore, this read out circuit 81, when energized by closure of its switch 83, closes only the gating circuits for interrogating these desired days of the memory 22.

By using the appropriate entry keys on keyboard 10, the office employee initially enters the day or other time period to be rescheduled, and this selection chooses the proper section of a multisectional memory 22 to be interrogated. Thereafter by closing the switch 83 to choose the first "option", the addresses of the memory 22, for the two days before and two days after, are interrogated to read-out the free time slots for these four days.

The other read-out circuits, including circuit 82 are connected to different groups of the gating circuits, and when energized, control the sequential interrogation of different groups of addresses of the memory 22, thereby to provide the different "options" as described above. Thus, one of the read-out circuits, when energized, controls the interrogation of the "morning" time slots in the memory 22; another controls the interrogation of "afternoon" time slots; still another interrogates for a still different "option", all as discussed above. It will be appreciated by those skilled in the art, that if more than one "option" is selected, it may be necessary to actuate the different read-out circuits in time sequence. This is performed by employing additional shift register circuits (not shown) to sequentially control the application of power to each of the read-out circuits. One such additional shift register 87 is shown in FIG. 6 for sequentially energizing the read-out circuits 81 and 82.

CANCELLATION OR RESCHEDULING BY AN INDIVIDUAL

The cancellation or rescheduling of an appointment, or appointments, at the initiative of an individual is performed in essentially the same manner as that performed at the initiative of an office, as discussed above. The individual may personaaly appear at the office, or may call over the telephone.

In either instance, that person provides the office with the date, or dates, of prior appointments to be cancelled or rescheduled, and such appointments are entered into the keyboard 10. If the appointment is to be rescheduled, that person is instructed to select a preferred "option" or time period that is most desired; or a series of such "options" as discussed above. This selection of an option, or options, is entered into the rescheduler by closing the appropriate switch, or switches, 11, 13, 15, 17, 19, 27, etc. (FIG. 1); and the resulting free time slots are displayed on the display screen 23, and/or printed at 24; and/or announced by the audible announcer 25. A final selection of one, or more, of such displayed free time slots is then made by that person and entered into the memory 22, using the keyboard 10. Where that person has personally appeared at the office, the rescheduler apparatus may be operated by that person, using available printed instructions, without the need for assistance by an office employee. Alternatively, an office employee can assist in the cancelling or rescheduling, if necessary.

On the other hand, where that person is calling over the telephone for a cancellation or rescheduling of one or more prior appointments, the office employee can use the voice announcer 25 to vocally inform the caller of the free time slots that are available, and enter the various "option" selections, and final selections of new appointments.

AUTOMATIC SELECTION OF NEW APPOINTMENTS

Figure 5:
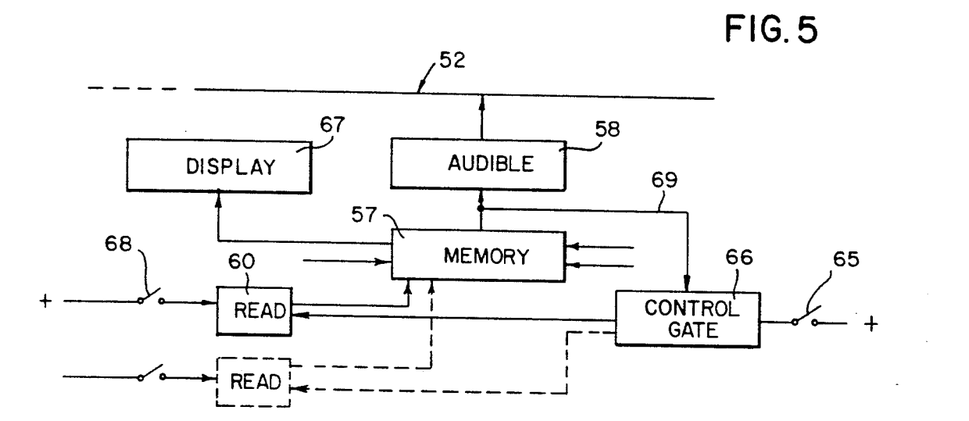
FIG. 5 is an electrical schedmatic illustration showing modifications to the circuit of FIG. 1 for automatic selection of a single free time slot, during any selected "option"

In the event that it is not necessary to give the person to be rescheduled with a complete listing of all free time slots during selected "options" or time periods, one or more new appointments can be located in an automatic manner, using the circuitry of FIG. 5, and the new appointments given to the person and entered into the memory 22 of the rescheduler.

Referring to FIG. 5, the person to be rescheduled is initially instructed to select one or more different "options" or time periods, and such selections are entered by closing the appropriate one, or ones of the option switches 11, 13 etc. (FIG. 1), in the same manner as discussed above, to interrogate the memory 22 and read-out the free or available time slots, if any, during such "option" periods. However, in the circuit of FIG. 5, the output channel of memory 57 is coupled in feedback, over line 59, to an automatic gate and control circuit 66. Control circuit 66 is, in turn, coupled to the mode or "option" read-out circuit 60, to discontinue interrogation by the read-out circuit 60 after a first free time slot is located, and outputted from the memory 57. In operation, when such an automatic selection is desired, the switch 65 is closed, thereby to actuate the automatic gate and control circuit 66. The selected "option" choosing switch 68 is then closed, according to the preference of the person being rescheduled, and this commences an interrogation of the memory 57 for the desired option, or options, selected. Thereafter upon the first free time slot being located during such interrogation, and outputted to the display 67, and/or audible announcer 58, a feedback signal is generated over line 69 to gate and control circuit 66 to discontinue any further interrogation of the memory 57. As a result, the first available free time slot is automatically selected for a new appointment, during each sequence of operations of the circuit of FIG. 5. Should additional appointments be desired to be rescheduled for such person, the above sequence of operations are repeated for each such prior appointment.

AUTOMATIC CANCELLING OR RESCHEDULING OVER THE TELEPHONE

In earlier U.S. Pat. No. 4,783,800, there is disclosed a system for enabling a caller to make, and confirm, an appointment over the telephone without the need for any person at the other end. According to an alternative embodiment of the present invention, there is provided in FIG. 4 a system for enabling a caller to reschedule a previously made appointment over the telephone, without the need for any person at the receiving end of the telephone line.

Figure 4:
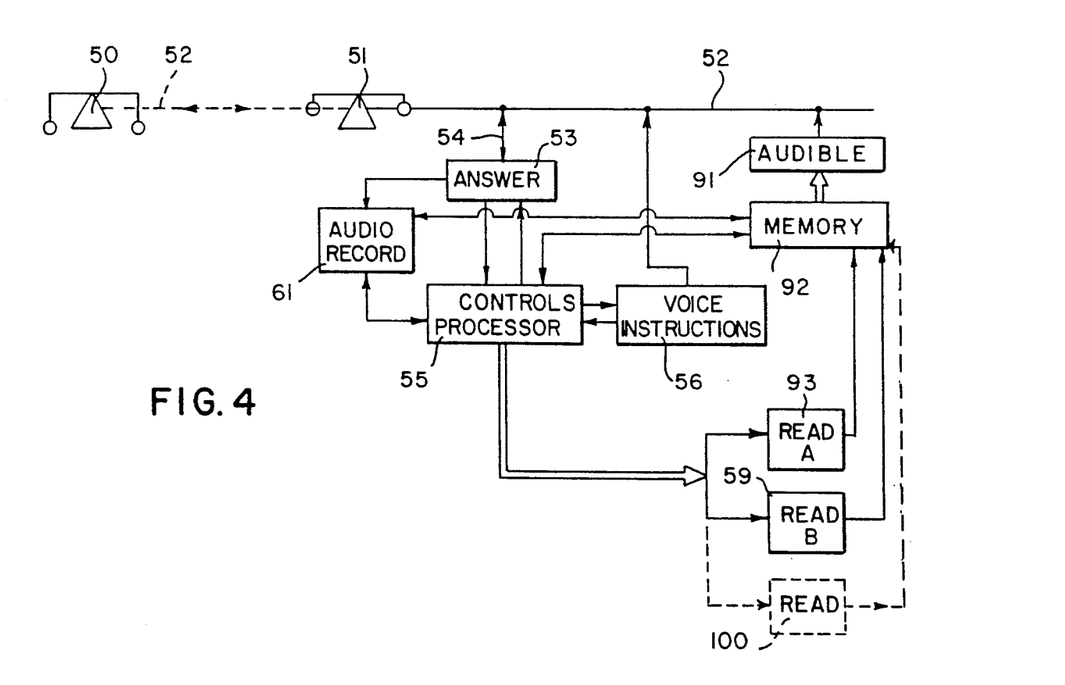
FIG. 4 is an electrical schematic illustration, showing automatic rescheduling over the telephone.

Referring to FIG. 4, a caller at a remote end of telephone line 52 places a call to a business or professional office at the remote end of line 52, with the intention of cancelling or rescheduling one, or more, prior appointments. This call is automatically intercepted by the telephone handset 51 and telephone answering device 53, in a conventional fashion, and activates a timer and control circuit 55 to energize a voice instruction unit 56. Voice unit 56 acknowledges the call, and inquires whether the caller wishes to either make a new appointment, or to cancel a prior appointment, or to reschedule a prior appointment. The caller is requested to choose the desired one of these three functions, by depressing the appropriate one of the three numbered keys "1", or "2", or "3", on the caller's telephone keypad.

In the event that the caller wishes to make a new appointment, the appropriate one of the telephone keys is depressed, to signal such selection, and thereafter the procedure described in the above earlier patent is followed to automatically make, and confirm, a new appointment. In the event that the Caller only wishes to cancel one or more prior appointments, the appropriate one of the telephone keys for such selection is depressed. The voice unit 56 then instructs the caller to enter the data and time of the prior appointment to be cancelled; and thereafter to dictate the caller's name, address, phone number, and the data of the prior appointment being cancelled. This audible information is recorded by recorder 61; and then is audibly played back over the telephone 52, to the caller, to protect against any errors. To avoid errors, or misuse of this automatic system, an office employee places a confirming telephone call to that Caller to confirm the correctness of the previous cancellation. If correct, the office employee then cancells the previous appointment in the memory 92. In the event that more than one prior appointment is to be cancelled by a caller, after completion of each above entry, the instruction unit 56 advises the caller to signal whether additional actions are to be taken (by depressing an appropriate number key on the keyboard) and, if so, the above sequence of operations is repeated.

In the event that the appropriate number key is initially depressed, or later after a first sequence is completed, thereby signaling that the caller wishes to reschedule a prior appointment to a different time and or day, the voice unit 56 vocally instructs the caller about the different procedure to be followed. Initially, the caller is instructed, by the voice unit 56, to enter the day and time of the prior appointment using the appropriate ones of the keys on the caller's telephone handset. This digital number is received by control unit 55, and voice unit 56 is then controlled to audibly repeat this day and time over the phone line 52, back to the caller, to insure against any error. This prior appointment is then entered into the memory 92, in the event it is confirmed by the caller (depressing the appropriate designated key).

The caller is then instructed by the voice unit 56, to select a desired one, or more, of the "options" available for a new appointment, as discussed above, by depressing the designated one, or ones, of the telephone keys, corresponding to the various "options". Thus the caller can select the earliest available free time slot; or an available one in the "morning" hours, or "afternoon" hours; or any of the others discussed above. The control circuit 56 again responds to receiving each of these digital commands from the caller, to automatically select the corresponding one, or ones, of the read-out circuits 93, 59 circuits 93, 59 etc., and the free time slots for each of such "option" or time period, are audibly announced over the phone line by the audible announcer 91 coupled to the memory 92. This audible announcement of the free time slots is preferably repeated, to insure that the caller receives the desired information.

The voice instruction unit 56 is thereafter activated to instruct the caller in making a final selection from those announced as being available for a new appointment. The rescheduled appointment day and time are subsequently repeated over the phone, to confirm the correctness of the selection, and are recorded at 61, for subsequent call back and further confirmation by an office employee, as discussed above.

If desired, the number of free time slots announced over the phone may be limited for any selected "option" by employing the circuit of FIG. 5, discussed above. The number announced can be limited to only one as in FIG. 5; or two, three, or more, as might be desired. If more than one is desired, a counter circuit (not shown), may be interconnected in the feedback line 69 (FIG. 5), to count a predetermined number of responses from the output of memory 57, before discontinuing the read out of the memory 57 for that selected option.

SIMPLIFIED AUTOMATIC RESCHEDULING OF APPOINTMENTS

It has been found that many callers that are inexperienced in the use of keyboards for data processing, and other functions, find it difficult to make, cancel, or reschedule appointments over the phone, in an automatic manner using the keys on the keypad as discussed above. Such persons find it particularly difficult to use more than one key on the keyboard, to enter, in sequence, both day, time-of-day, and/or other data. For this reason, the following alternative embodiment of the invention, is provided to permit a caller to perform any of the above described functions by depressing only one numbered key in response to each different instruction.

Referring again to FIG. 4, this alternative embodiment is performed by having the voice unit 56 issue many more instructions, and requiring the caller to respond to each by using only a single key for each response. In operation, a call is responded to by the rescheduler in the same manner by instructing the caller to select one of the three keys "1", "2", or "3" to make a new appointment, cancel a prior appointment, or reschedule a prior appointment. If the call is to reschedule, the voice unit 56 audibly announces the present day (e.g. Thursday, July 21), and requests the caller to select a new day for appointment, by depressing a number key corresponding to the day for the new appointment. For example, if an appointment is desired for the next day, the caller is instructed to depress the "1" key (for the next day). If for the day after, the caller is instructed to depress the number key "2". If for the third day after the present, the caller is requested to depress the number "3". Each such digital number is received by control 55 which thereupon selects a corresponding one of the read-out circuits 59 or 93 or . . . , to interrogate the memory 92 for that day, and read-out the free or available time slots on that day. These free time slots are announced over the phone by the audible output 91.

The caller is then requested by the voice instruction unit 56 to choose a suitable new appointment time, from those announced as being available, (for example, only three free time slots may be announced), by selecting one of the three numbers "1", "2", or "3", that correspond to the three previously announced free time slots.

The voice unit 56 then audibly confirms the selections by the caller by announcing the day and time-of-day, of the previous selections, and requests the caller to confirm the correctness of this new appointment by depressing the key number "9" if correct, or the key "0", if incorrect. If the new appointment is confirmed to be correct, the caller is requested to dictate his name, phone, address, and new appointment, and an office employee later calls back to confirm the new appointment, and to obtain the date and time of the prior appointment to be cancelled.

SIMPLIFIED TELEPHONE APPOINTMENT RESCHEDULING

In a further alternative embodiment, the system can be configured to enable a Caller to reschedule an appointment, or schedule a new one, using only the "0" or "one" number keys on the Caller's telephone, signifying a yes or no response to a series of inquiries.

Referring again to FIG. 4, a telephone call to the office according to this embodiment results in a sequence of many more voice instructions from unit 56 than before, with each such instruction or question requesting a "yes" or "no" response from the Caller, by the depression of the "1" or "0" key, respectively.

A first question from unit 56 of the office, asks if the Caller wishes to cancel or reschedule a prior appointment, and if the response is to be "yes", the Caller depresses the "1" key. This digital response is received, and the office scheduler then energizes the voice unit 56 to audibly announce the day and time of the phone call and request whether the Caller wishes an appointment on the next day. If the Caller's response is "yes", the office unit interrogates the section of memory 91 for the next day, by read-out circuit such as 59, and reports a free time slot, if any, that is available on that next day. This free time slot is announced over the phone line by voice output circuit 91. The voice instruction unit 56 is then progressed to ask the Caller whether this free time slot is acceptable, and if so, the voice unit 56 repeats this time and date over the phone line and states that a new appointment has been rescheduled for this time. The voice unit 56 then asks the Caller to dictate the Caller's name, address, phone number, and prior date of appointment to be cancelled, and to repeat the new appointment time. This dictated information is recorded at the office recorder 61, enabling an office employee to subsequently call back the Caller on the next business day, or during other business hour, to confirm the rescheduled appointment to the new time, for that person.

On the other hand, if the Caller's response to any previous inquiry by the office machine is a "no", the control circuit 55 alternatively energizes the voice unit 56 to issue a different audible inquiry or instruction. For example, the voice unit 56 may ask whether the Caller wishes an appointment on the second day following the call. This procedure is repeated for each "no" response with different "options" being offered in succession to the Caller until the Caller responds with an affirmative "yes". When this occurs, the appropriate read out circuit for the selected "option" is energized to interrogate the chosen time period in the memory 92. A free time slot, if any is available, is reported over the telephone to the Caller, and new appointment is made, as described above. If the reported free time slot is not accepted by the Caller, the interrogation of the memory 92 is continued for the selected option, until an acceptable free time slot is located. If none is found, the voice unit 56 asks the Caller to select a a different option, and the above sequence of steps is repeated until locating an acceptable new time for an appointment.

Following the above sequential procedure, the Caller selects a new appointment time using only "yes" or "no" responses. This new appointment time is announced by the voice unit 56 for confirmation purposes, and the Caller is requested to confirm this time, and to then audibly dictate the Caller's identification and other information, as discussed above. This is recorded by the office recorder 61, to be later confirmed, by a callback, and, if confirmed, the new appointment time is entered into the memory 92 and the prior appointment is cancelled in the memory 92.

In a similar manner, the voice response unit 56 requests the Caller to select other "options", as described above, including either a "morning" or "afternoon" appointment; or other desired one. These are all presented in sequence, with a request after each such inquiry, for a "yes" or "no" response from the Caller. Once such a desired "option" is located by this yes or no interactive procedure, the appropriate section of the memory is interrogated to locate and report the free time slots that are available, as described above. It will be understood, that anumber of such "options" can be presented within a reasonable time, to a Caller, to quickly locate an acceptable new time slot. If none can be found by this interactive procedure, the Caller is then instructed to telephone a different number and try to schedule a new appointment in a conventional manner with an office employee.

PORTABLE BATTERY POWERED UNIT FOR CALLER

Figure 7:
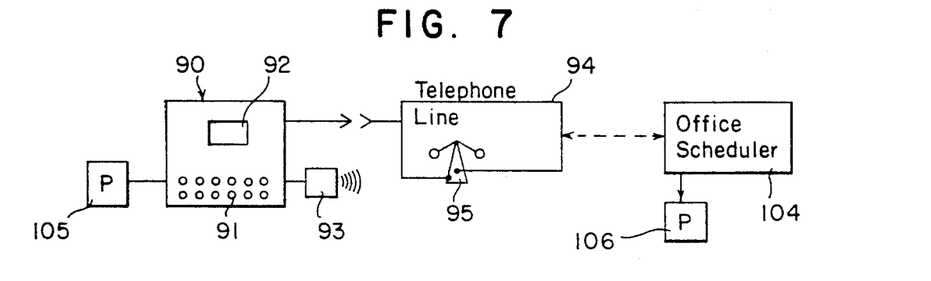
FIG. 7 is a block diagram illustrating a portable caller's transmitter and receiver in an alternative telephone system according to the invention.

As an alternative to the Caller using a telephone handset to make a new appointment or reschedule a prior appointment, a special transmitter-receiver unit 90 (FIG. 7) can be provided for the Caller, and offering many advantages. Such a Caller's unit preferably includes a keyboard, 91 a visual output display, 92 and audible output announcer, 93 and digitally operating transmit and receive circuitry, for communicating over the telephone line 94. Such a specialized Caller's unit may be provided as a separate, hand held, battery powered unit 90 connectable to a telephone line 94 or to a telephone 95 by plug-in connection; or alternatively, be provided as part of an integrally made unit and telephone. It may also be a dedicated unit for scheduling functions, with specially allocated keys on the keyboard, 91 and a specially allocated visual display 92 that is best adapted to display appointment information.

Figure 8:
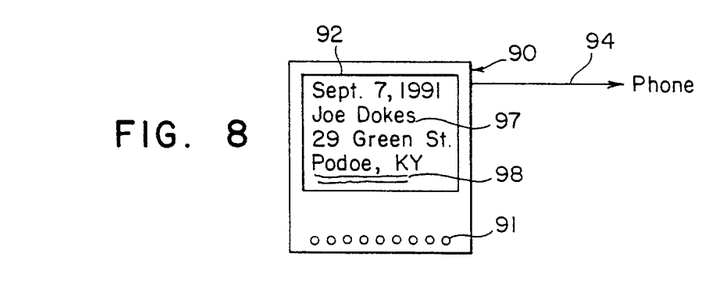
FIG. 8 shows the display screen of the portable unit of FIG. 7 depicting identifying information about the caller.

In operation, such a Caller's unit interactively functions in a similar manner with the office scheduler machine, as described above, but with additional advantages. Among others, the specialized Caller's unit can display on screen 92 all of the instructions, messages, and free time slot information that is received over the telephone line 94 from the office machine, as well as audibly announcing such messages and data by annunciator 93. As shown in FIG. 8, it can display the present date and time 96 from an internal clock, and can automatically display and send over phone line 94 to the office machine, the Caller's name, address, phone number, and other information 98 from the Caller, for recording by the office recorder 61 (FIG. 4).

All of the "options" offered by the Office machine can be displayed as a single column on the Caller's display unit, as shown in FIG. 8 with a different number for each line of the column. To select any such "option", the Caller then merely needs to depress the appropriate number key 99 for that "option" and a digital message is sent back over phone line 94 to the office machine for that selection. Similarly, the free time slots being reported by the office machine, as available during a selected option, can also be presented as one or more columns, on the Caller's display (similar to FIG. 2), with a different number for each line on the column or columns. Again a Caller need only depress a single one of the number keys 99 to select any one of such free time slots, and a digital message for that selection is sent back to the office machine over the telephone line 94.

Figure 9:
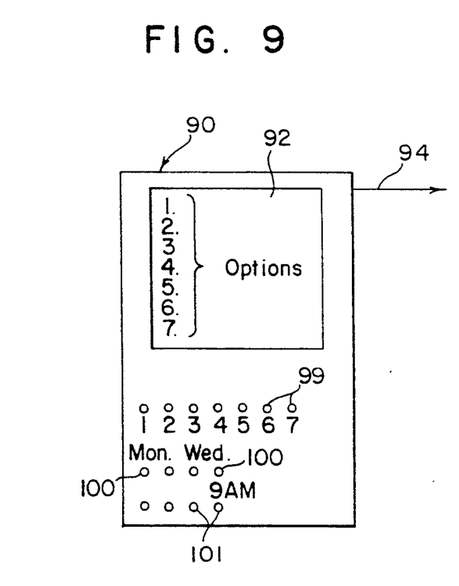
FIG. 9 shows the display screen of the unit showing the "scheduling options" received from the remotely located office.

In the event that such a Caller's unit is dedicated to scheduling and rescheduling functions, dedicated keys of the keyboard 100 (FIG. 9) may be allocated to different days of the week; as well as other keys 101 reserved for different times-of-day. Depression of any such keys results in sending a digital message over the telephone line 94 for that day or time.

Figure 10:
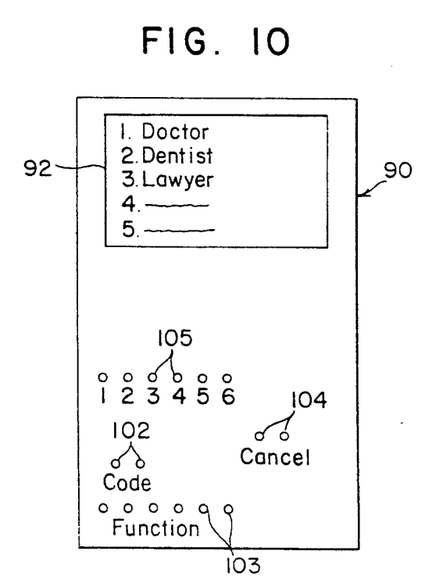
FIG. 10 shows further information displayed on the caller's screen, for automatic dialing, together with dedicated keys for sending messages, or selections, over the phone line.

As shown in FIG. 10, a dedicated Caller's unit may also include automatic dialing circuits (for the offices of Lawyers, Chiropractors, Dentists etc., with whom appointments are to be made). It may also contain a clock, and circuits for automatically transmitting the Caller's name, address, and other identifying data, such as charge card number, social security number etc (as in 97—FIG. 8). Where the information is of a private nature, it would not be automatically transmitted, but instead sent only by the Caller depressing an appropriate one of code keys 102 that controls the transmission of such information. All of such data transmission circuitry greatly simplifies the procedure followed by a Caller in making or rescheduling an appointment in an automatic or semiautomatic manner over the telephone.

In operation of such a dedicated unit, the Caller need only initially depress a single key 101 to call a desired office (e.g. Chiropractor). Upon the call being completed, the Caller then need only depress a single function key 103 to inform that office that it wishes to make a new appointment or reschedule a prior appointment. Depressing only one more key, (99—FIG. 9) then proceeds to select a desired one of the various "options" or time periods, that is desired by the Caller. Digital messages (e.g. tone etc.) are received at the office machine 104 (FIG. 7) for each of these selections, and the office memory is interrogated to report the free time slots that are available from that office for a new appointment during that "option" period. The Caller then need only depress one more of the keys 100, 101 (FIG. 9) to select a preferred one of the free time slots for a new appointment, and this selection is digitally transmitted over the telephone line to the office machine and entered into the office memory 104 along with an identification of the Caller 97 (FIG. 8) that is automatically transmitted as discussed above. The Caller then depresses the appropriate one or more keys 104 (FIG. 10) to cancel a prior appointment.

All of the above described instructions, questions, messages, free time slots, and selections thereof, are preferably displayed on the Caller's display screen 92 as well as on the display screen in the office 104 at the other end of the telephone line. Additionally, such information and data is audibly announced at both locations, as at 93 (FIG. 7) and may be printed 105, 106 (FIG. 7) as a record, if desired.

It will be appreciated by those skilled in the art that many changes and additions may be made without departing from the spirit and scope of this invention; and that the various embodiments disclosed do not set forth the design features that are well known, and may be used in commercial products using this invention. For example, a preferred office machine may be provided as a desk top unit with large screen display, positionable alongside a receptionist's telephone exchange. The internal circuits and controls may be dedicated to scheduling and rescheduling functions, and others, so as to be user friendly by the least experienced office employees. For example, the keys on the keyboard may be dedicated to different days of the week, and other keys dedicated to different times of day; all being prominantly labeled for convenience use by substantially untrained employees. Simplified instructions can be provided in printed form, as well an in internal ROM circuits, and accessed by any user for display on the visual screen; and/or by audible announcement. Such an office unit may alternatively be combined with the telephone handset, or telephone exchange, or be provides as a separate standalone structure that is detachably connectable to the telephone line. The office machine may provide other communication functions that are useful to that office, and may output other information by visual display, voice output or printing. For combined use by many persons in a firm, office, or clinic, the above described apparatus can be duplicated with additional memory, and other controls, and connected to time share a common display screen, audible output, common instruction generator, and other components as described. For automatic or semi-automatic interactive operation, an initial inquiry of a user or Caller, can ask the user or Caller to select a desired one of those listed persons with whom an appointment is desired, and the office apparatus may then interrogate the correspondingly allocated section of the memory for the free time slots of the selected person.

Since these and many other changes can be made by those skilled in the art, this invention is to be considered as being limited only by the following claims.

I claim:

1. An interactive electronic scheduling system for making or changing appointments including:
   a dedicated transmit-receive unit usable by an individual desiring to make or change an appointment with another over a communication channel, and connected to said channel,
   said dedicated unit including a visual display screen for displaying messages, instructions, and and appointment data,
   said dedicated unit including dedicated switching means for enabling said individual to select one of a plurality of different option for an appointment, and transmitting said selection over said channel,
   said dedicated unit additionally including dedicated switching means for enabling the individual to select specific dates and times for an appointment, and transmitting said selections over said channel,
   said dedicated unit additionally including dedicated switching means for enabling the individual to transmit other data pertaining to appointments over said channel,
   all of said switching means being identified on the unit whereby the individual can effectuate the transmission of options, dates and times, and other data for appointment without the need for composing such transmissions from general purpose switching means,
   said dedicated unit including receive circuits coupled to said channel for receiving information over said channel from a remote scheduler pertaing to instructions in the procedure in making appointments, and receiving over said channel from said scheduler of free time slots that are available for appointment, said display screen being coupled to said receive circuits for displaying said information and free time slots on said screen.

2. In the system of claim 1, said dedicated transmit-receive unit additionally including an audible output for audibly announcing said free time slots.

3. In the system of claim 1, said transmit-receive unit being detachably connectable to said channel.

4. An interactive electronic scheduling system for making and confirming an appointment over a telephone line between a caller at one end of the line and an electronic scheduler at the other end, without the need for any person at the electronic scheduler end of the line, at the caller's end of the line, a portable electronic transmitter-receiver unit being connectable to the telephone line, said caller's unit including an interconnected keyboard, visual display, and digital transmit-receive circuitry, said transmit-receive circuitry responsive to actuation of different keys of the unit to digitally transmit different messages over the line pertaining to preferred days, or other time periods, when an appointment is desired, said transmit-receive circuitry responsive to digital messages received back over the line reporting about the free time slots that are available for appointment during said preferred day, or other time period, and said visual display displaying the received messages over the telephone line.

5. In the system of claim 4, said portable caller's unit being battery powered and detachably connectable to the telephone line, and said unit additionally having a voice annunciator for audibly announcing the messages received over the telephone line.

6. In the system of claim 4, said receiving circuitry and visual display responsive to receiving digital instructions over the telephone lines for displaying said instructions, thereby to inform a caller about the procedure to be followed in making and confirming an appointment.

7. An interactive electronic scheduling system for making or changing appointments including:

a dedicated transmit-receive unit usuable by an individual desiring to make or change an appointment with another, said dedicated transmit-receive unit including a visual display screen for displaying messages, instructions, and appointment data, said dedicated unit including dedicated switching means for enabling said individual to select one of a plurality of different options for an appointment, and transmitting said selection, said dedicated unit additionally including identified switching means for enabling the individual to select specific dates and times for an appointment, and transmitting said selection, and said dedicated unit additionally including identified switching means for enabling the individual to transmit other data pertaining to an appointment, all of said switching means being identified on the unit whereby the individual can effectuate the transmission of data including fixed messages and dates and times for appointment without the need for composing such data from general purpose switching means.

8. In the interactive electronic scheduling system of claim 7, said additionally included switching means in the dedicated unit enabling the individual to transmit personalized identifying data and financial data in association with said appointment.

9. In the interactive electronic scheduling system of claim 7, said dedicated unit being coupled to a telephone line for transmission and reception of such data with another at a distant location.

10. In the interactive scheduling system of claim 7, said dedicated unit automatically transmitting data identifying that individual to another to complete the appointment.

11. In the interactive electronic scheduling system of claim 7, said dedicated unit being coupled to a telephone line, and internally including a telephone directory of others that is selectively displayable on its display screen, and additional switching means, usable by the individual, for enabling the individual to automatically telephone any of the others displayed on the directory.

12. In the interactive electronic scheduling system of claim 7, said dedicated unit being detachably coupled to a telephone line.

13. In the interactive scheduling system of claim 7, said switching means comprising a keyboard having dedicated keys for controlling the transmission of message and appointment data.

14. In the interactive electronic scheduling system of claim 7, said dedicated unit including an internal electronic clock, and circuitry for automatically transmitting identifying data about the individual, including name, address, and phone number.

15. In the interactive electronic scheduling system of claim 7, said dedicated unit being integrally coupled to a telephone line.

16. In the interactive electronic scheduling system of claim 7, said dedicated unit including an audible annunciator, whereby received data is both displayed on the display screen and is audibly announced.

* * * * *